United States Patent
Jones

(10) Patent No.: US 6,301,218 B1
(45) Date of Patent: Oct. 9, 2001

(54) CARTRIDGE ENGAGING ASSEMBLY WITH FLOATING FINGER AND FLEXIBLE GATE ASSEMBLIES

(75) Inventor: David P Jones, Bellvue, CO (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/398,740

(22) Filed: Sep. 17, 1999

(51) Int. Cl.[7] .................................................. G11B 15/68
(52) U.S. Cl. .............................................. 369/178; 360/92
(58) Field of Search .............................. 369/178, 34, 36, 369/37, 38, 75.1, 75.2, 77.1, 77.2; 360/92

(56) References Cited

U.S. PATENT DOCUMENTS

| | | | |
|---|---|---|---|
| 4,608,679 | 8/1986 | Rudy et al. | 369/36 |
| 4,675,856 | 6/1987 | Rudy et al. | 369/36 |
| 4,827,463 | 5/1989 | Motoyoshi et al. | 369/36 |
| 4,853,916 | 8/1989 | Tomita | 369/36 |
| 4,903,252 | 2/1990 | Tanaka et al. | 369/36 |
| 4,918,548 | 4/1990 | O'Donnell et al. | 360/92 |
| 5,010,536 | 4/1991 | Wanger et al. | 369/36 |
| 5,014,255 | 5/1991 | Wanger et al. | 369/36 |
| 5,043,962 | 8/1991 | Wanger et al. | 369/36 |
| 5,146,375 | 9/1992 | Satoh et al. | 360/92 |
| 5,631,785 | 5/1997 | Dang et al. | 360/92 |
| 6,185,165 | * 2/2001 | Jesionowski et al. | 369/34 |
| 6,195,007 | * 2/2001 | Takayama et al. | 340/572.1 |

FOREIGN PATENT DOCUMENTS

| | | |
|---|---|---|
| 0709169 | 5/1996 | (EP) . |
| 62-219364 | 9/1987 | (JP) . |

OTHER PUBLICATIONS

U.S. Patent application Ser. No. 08/641,442 filed Apr. 29, 1996 for Single-Side Engaging Picker for Data Cartridges of Robert Luffel.

* cited by examiner

Primary Examiner—David L. Ometz
Assistant Examiner—Franklin D. Altman, II

(57) ABSTRACT

A cartridge engaging assembly for translating a cartridge is disclosed. The cartridge engaging assembly comprises a laterally extending thumb member adapted to abuttingly engage the cartridge. The assembly further comprises a floating finger assembly which is detached from the thumb member and is also adapted to engage the cartridge. The finger assembly comprises at least one floating finger member with a front portion, a rear portion, and a latch portion with a guide post attached thereto. The finger assembly may comprise recovery devices for recovering a displaced floating finger member. The assembly further comprises at least one guide sleeve with an elongate track adapted to receive the guide post, and a flexible gate assembly positioned within the elongate track at the forward end thereof. The assembly further comprises a get operating mode, a first retrieve operating mode, a first put operating mode, a second put operating mode, and a second retrieve operating mode. A method of translating a cartridge with a cartridge engaging assembly from a first cartridge receiving device to a second cartridge receiving device is also disclosed.

16 Claims, 15 Drawing Sheets

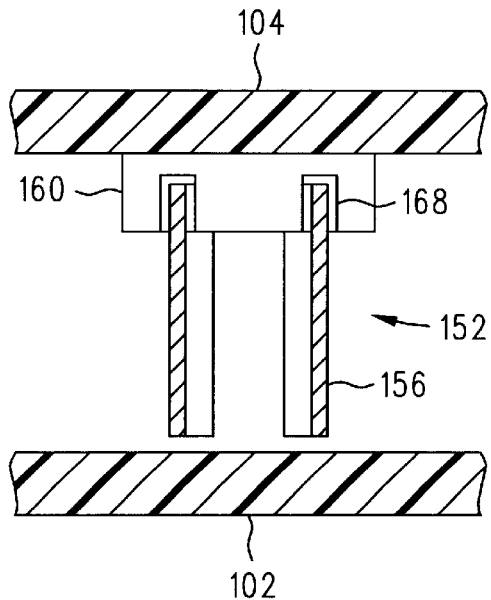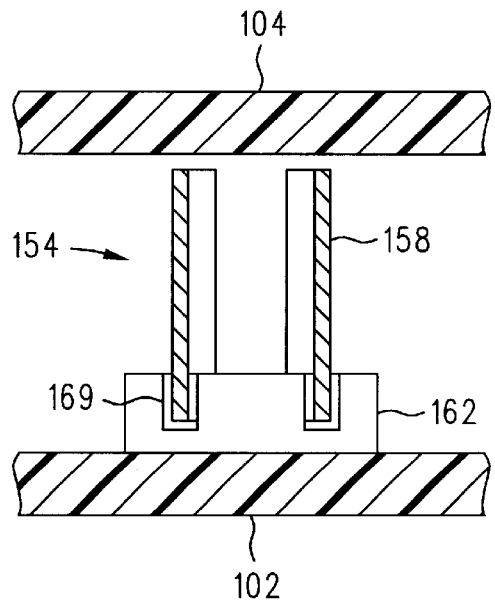
FIG. 6A     FIG. 6B
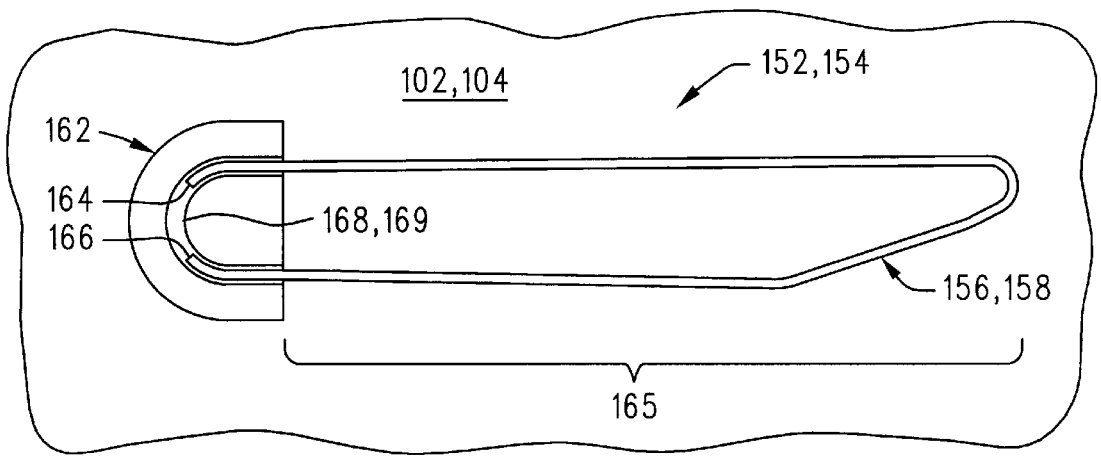
FIG. 7

CARTRIDGE ENGAGING ASSEMBLY WITH FLOATING FINGER AND FLEXIBLE GATE ASSEMBLIES

FIELD OF THE INVENTION

The present invention relates generally to a cartridge handling system for storing and translating data cartridges, and more specifically to a floating finger assembly and a flexible gate assembly for a cartridge engaging assembly which is utilized within a cartridge handling system.

BACKGROUND OF THE INVENTION

Data storage in the computer industry is accomplished in a number of ways. For example, data may be stored on tape, compact disk, "floppy" or "hard" disk, and the like. Oftentimes, data storage media which is transferrable from one location to another is housed within a parallelepiped-shaped cartridge. Data storage systems are used to store data storage media devices such as data cartridges at known locations and to retrieve desired cartridges so that data may be written to or read from the cartridges. Such data storage and handling systems are often referred to as "juke box" data storage systems, particularly if they can accommodate a large number of individual data cartridges.

A data storage handling system may include a cartridge engaging assembly or "picker" which is adapted to retrieve a data cartridge and transfer the cartridge from one location to another, such as from a cartridge storage array to a read/write drive. The drive may then be used to read data from or write data to the cartridge. Once the read/write operation is complete, the cartridge engaging assembly may withdraw the data cartridge from the drive and return it to the appropriate location within the cartridge storage array.

A cartridge engaging assembly may be comprised of one or more latching "fingers" that are adapted to hook into notches in a data cartridge. The fingers may be pivotally attached to a motor-driven, laterally extending "thumb" member which is adapted to translate the fingers in a longitudinal direction as well as push a cartridge out of the cartridge engaging assembly. The latching and releasing of a cartridge by a finger is typically accomplished by the longitudinal translation of the thumb in cooperation with some type of finger guide assembly.

One type of finger guide assembly provides the fingers with guide posts which run along elongate tracks within the cartridge engaging assembly. Each of the elongate tracks typically has at least two branches, an inner branch and an outer branch, which provide different paths on which the fingers may travel. The fingers may be attached to a biasing member such as a spring which urges them inwardly and forces the fingers to follow an inward most path when they are not grasping a cartridge. An outermost path may also be provided which forces the fingers to splay outwardly to release a cartridge. In cartridge handling assemblies with relatively long fingers, the width of each elongate track, including the innermost path and the outermost path, must also be relatively wide. The longer the fingers, the farther they splay outwardly as the thumb travels forwardly. The width of the elongate tracks is directly related to the overall width of the cartridge handling assembly.

One or more one-way gates may be positioned on the elongate tracks which guide the fingers to particular paths depending on the desired operation. A one-way gate allows a finger guide post to pass when the thumb and finger are traveling in a certain longitudinal direction, either forwardly or rearwardly. When the thumb and finger are traveling in the opposite direction, the one-way gate blocks the path and forces the finger onto a different path. A gate typically comprises some type of biasing member which allows it to move out of the path of a finger guide post.

Cartridge engaging assemblies such having features discussed above are described in U.S. Pat. No. 5,014,255 for OPTICAL DISK CARTRIDGE HANDLING APPARATUS WITH PASSIVE CARTRIDGE ENGAGEMENT ASSEMBLY; U.S. Pat. No. 5,010,536 for CARTRIDGE HANDLING SYSTEM; and U.S. Pat. No. 5,043,962 FOR CARTRIDGE HANDLING SYSTEM, which are each hereby specifically incorporated for all that is contained therein. Each of the above references illustrate a two-finger assembly, each of the fingers being attached to a thumb, and a forwardly-positioned gate. A cartridge engaging assembly with a relatively long, one-finger assembly attached to a thumb and a rearwardly-positioned gate is described in U.S. patent application Ser. No. 08/641,442 filed Apr. 29, 1996 for SINGLE-SIDE ENGAGING PICKER FOR DATA CARTRIDGES, which is hereby specifically incorporated for all that is contained therein. Such a one-finger assembly may be used for handling DLT tape cartridges with only one notch therein.

Thus, there exists a need for a finger assembly which is simply constructed and minimizes the use of attachments and biasing members. It would be most desirable to provide a floating finger assembly which is completely detached from the thumb, whereby the length of the fingers does not affect the necessary width of the elongate tracks, and thus the overall width of the cartridge handling assembly. A floating finger assembly accomplishes this by allowing the thumb to move forwardly independently of the fingers. The lateral space required by the slight lateral movement of floating fingers is usually considerably less than the lateral space required for relatively long fingers to rotate and splay outwardly with the forward movement of the thumb. Preferably, such a floating finger assembly should be quickly and easily recoverable should a floating finger be displaced.

There also exists a need for a flexible gate assembly which is also simply constructed and minimizes the use of attachments and biasing members. The flexible gate assembly would preferably be positioned at the forward end of the elongate track, rather than the rear end, so that the length of the elongate track is minimized.

SUMMARY OF THE INVENTION

The present invention is directed to a cartridge engaging assembly for translating a cartridge. The cartridge engaging assembly comprises a laterally extending thumb member having a first surface and a second surface and adapted to abuttingly engage a cartridge. The cartridge engaging assembly further comprises a floating finger assembly with at least one floating finger member. Each floating finger member is detached from the thumb member and comprises a latch portion adapted to engage a notch in the cartridge and at least one guide post attached to and extending from the latch portion. The finger member further comprises a substantially laterally extending front portion comprising a first inner surface which is abuttingly engageable with the thumb member first surface, and a substantially laterally extending rear portion comprising a second inner surface which is abuttingly engageable with the thumb member second surface. The first inner surface is preferably oriented at an angle to the second inner surface. The finger member front portion further comprises a first outer surface, and the finger member rear portion further comprises a second outer surface.

The front portion and the rear portion may each comprise a recovery device comprising a one-way hinge member which allows the thumb member to pass thereby when the thumb member abuttingly engages either the finger member first outer surface or second outer surface, but does not allow the thumb member to pass thereby when the thumb member abuttingly engages either the finger member first inner surface or the second inner surface.

The assembly further comprises at least one guide sleeve comprising an elongate track adapted to receive the guide post. The elongate track comprises a forward end, a rear end, an inner branch and an outer branch. The assembly further comprises at least one flexible gate member which may be comprised of a thin, elongate strip of material which is compressible and rotatable and positioned entirely within the elongate track at the forward end thereof. The flexible gate member is secured to the elongate track with an attachment member. The attachment member may comprise a groove which is adapted to receive the ends of the flexible gate member to form a loop and securedly hold the flexible gate member.

The cartridge engaging assembly may further comprise a get operating mode whereby the assembly is going to "get" a cartridge, a first retrieve operating mode whereby the assembly "retrieves" a cartridge into the assembly, first and second put operating modes whereby the assembly goes to "put" a cartridge into a cartridge receiving device such as a cartridge storage location or a read-write drive, and a second retrieve operating mode whereby the assembly "retrieves" the finger members and goes back to its original position prior to entering into the get operating mode.

The present invention is also directed to a method of translating a cartridge with the cartridge engaging assembly described above from a first cartridge receiving device to a second cartridge receiving device. The first step of the method comprises translating the thumb member in a forward longitudinal direction whereby the thumb member abuttingly engages the finger member front portion, aligning the finger member first inner surface with the thumb member first surface so that the finger member rear portion is urged laterally outwardly and the finger member guide post is urged laterally inwardly, displacing the guide post along the inner branch of the elongate track, and latching onto the cartridge with the finger member. The second step of the method comprises translating the thumb member in a rearward longitudinal direction whereby the thumb member abuttingly engages the finger member rear portion and the finger member pulls the cartridge member from the first cartridge receiving device in a rearward longitudinal direction, displacing the guide post along the inner branch of the elongate track, and compressing and rotating the flexible gate member to allow the guide post to pass thereby. The third step of the method comprises translating the cartridge engaging assembly with the cartridge to the second cartridge receiving device. The fourth step of the method comprises translating the thumb member in a forward longitudinal direction whereby the thumb member abuttingly engages the finger member front portion and the finger member front portion abuttingly engages the cartridge whereby the finger member pushes the cartridge in a forward longitudinal direction, and displacing the guide post along the outer branch of the elongate track. The fifth step of the method comprises disengaging the finger member from the cartridge and placing the finger member in a parked position, and translating the thumb member in a forward longitudinal direction past the finger member whereby the thumb member abuttingly engages the cartridge and pushes the cartridge into the second cartridge receiving device in a forward longitudinal direction. The sixth step of the method comprises translating the thumb member in a rearward longitudinal direction whereby the thumb member abuttingly engages the finger member rear portion and disengages the finger member from the parked position, and aligning the finger member second inner surface with the thumb member second surface.

BRIEF DESCRIPTION OF THE DRAWINGS

Illustrative and presently preferred embodiments of the invention are shown in the accompanying drawings in which:

FIG. 6 sectional view of a gate assembly from the cartridge engaging assembly of FIG. 3;

FIG. 7 is a top view of a gate member from the cartridge engaging assembly of FIG. 3;

DETAILED DESCRIPTION OF THE INVENTION

Figure 1:
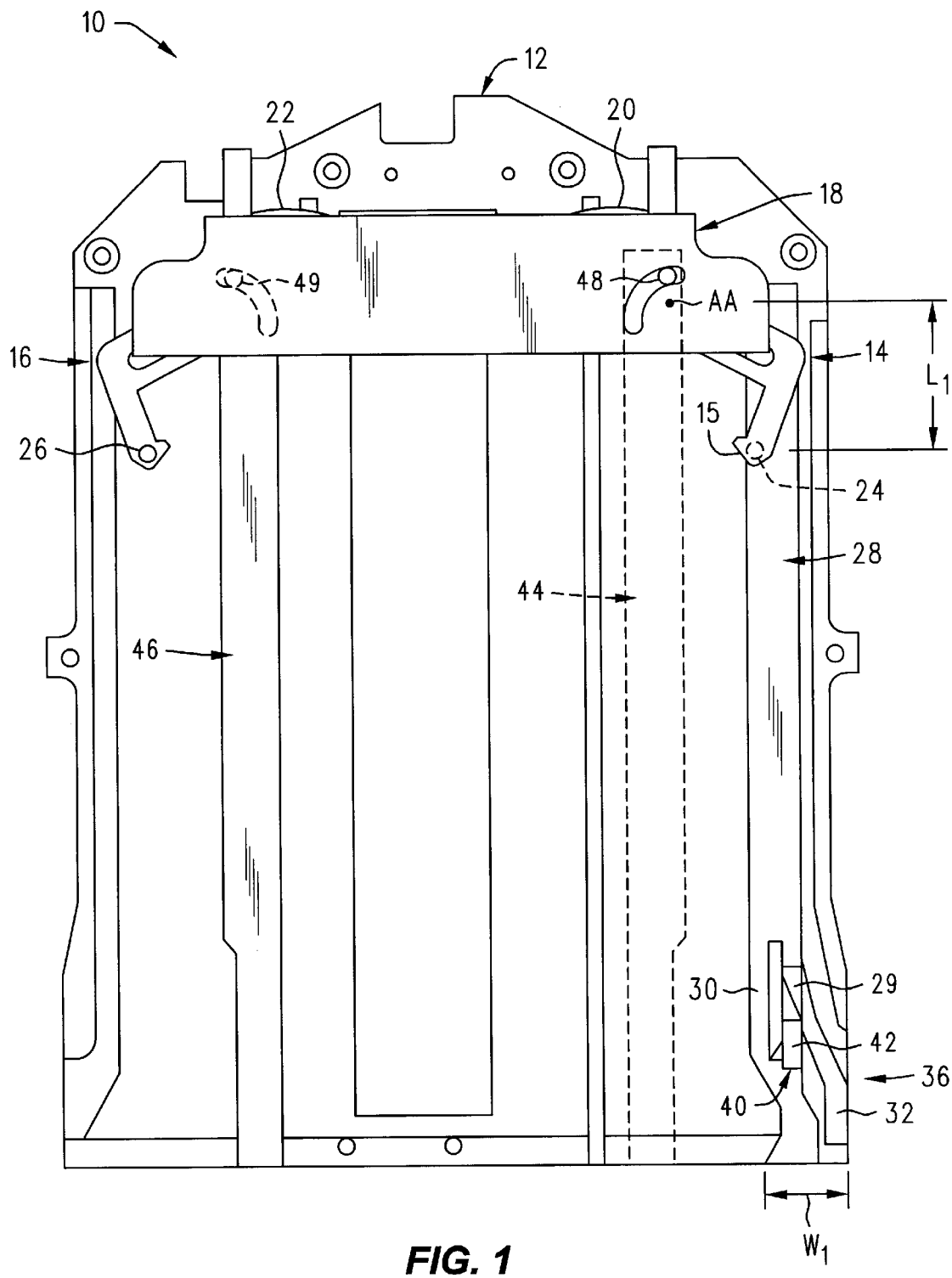
FIG. 1 is a top plan view of a two-finger cartridge engaging assembly whereby the fingers are attached to the thumb.

FIG. 1 illustrates a cartridge engaging assembly 10 of the type shown in U.S. Pat. Nos. 5,014,255; 5,010,536; and 5,043,962, which were incorporated by reference above. The cartridge engaging assembly 10 comprises a guide sleeve 12 with a plurality of elongate tracks 28, 46. A substantially identical guide sleeve (not shown) may also be provided which fits on top of the guide sleeve 12. The cartridge engaging assembly 10 further comprises a pair of finger members 14, 16 which are pivotally mounted to a thumb member 18. Biasing springs 20, 22 are provided which urge the finger members 14, 16 inwardly (i.e., toward one another).

Each of the finger members 14, 16 is provided with a first guide post 24, 26. The finger members 14, 16 are positioned on opposite sides of the thumb member 18 and may be substantially identical to one another. The description of finger member 14 below applies equally to finger member 16. The finger member 14 has a latch portion 15 which engages a notch in a cartridge (not shown), and is rotatable on the thumb member 18 around an axis AA. The finger member 14 guide post 24 is received within a first elongate track 28 in the guide sleeve 12.

The first elongate track 28 includes an inner branch 30 and an outer branch 32 at the forward end 34 of the guide sleeve 12. The cartridge engaging assembly 10 further includes a pair of identical one-way gate members, e.g., 40 (only one shown), which assist in diverting the finger member 14 guide post 24 from one branch to another. Only the head portion 42 of the gate member 40 projects through a cutout 29 in the first elongate track 28. The body portion (not shown) of the gate member 40 is attached to the guide sleeve 12 at the outer side thereof. The gate member 40 body portion includes a flexible neck portion which allows the gate member to be deflectable into and out of the cutout 29, and thus into and out of the path of the first guide post 24.

Each of the guide sleeves, e.g., 12, also comprises a second elongate track 44, 46 which receive a second guide post 21, 23 on each of the finger members 14, 16. The second elongate track 44, 46 and guide posts 48, 49 provide further guidance for the finger members 14, 16 during particular operating modes.

Figure 2:
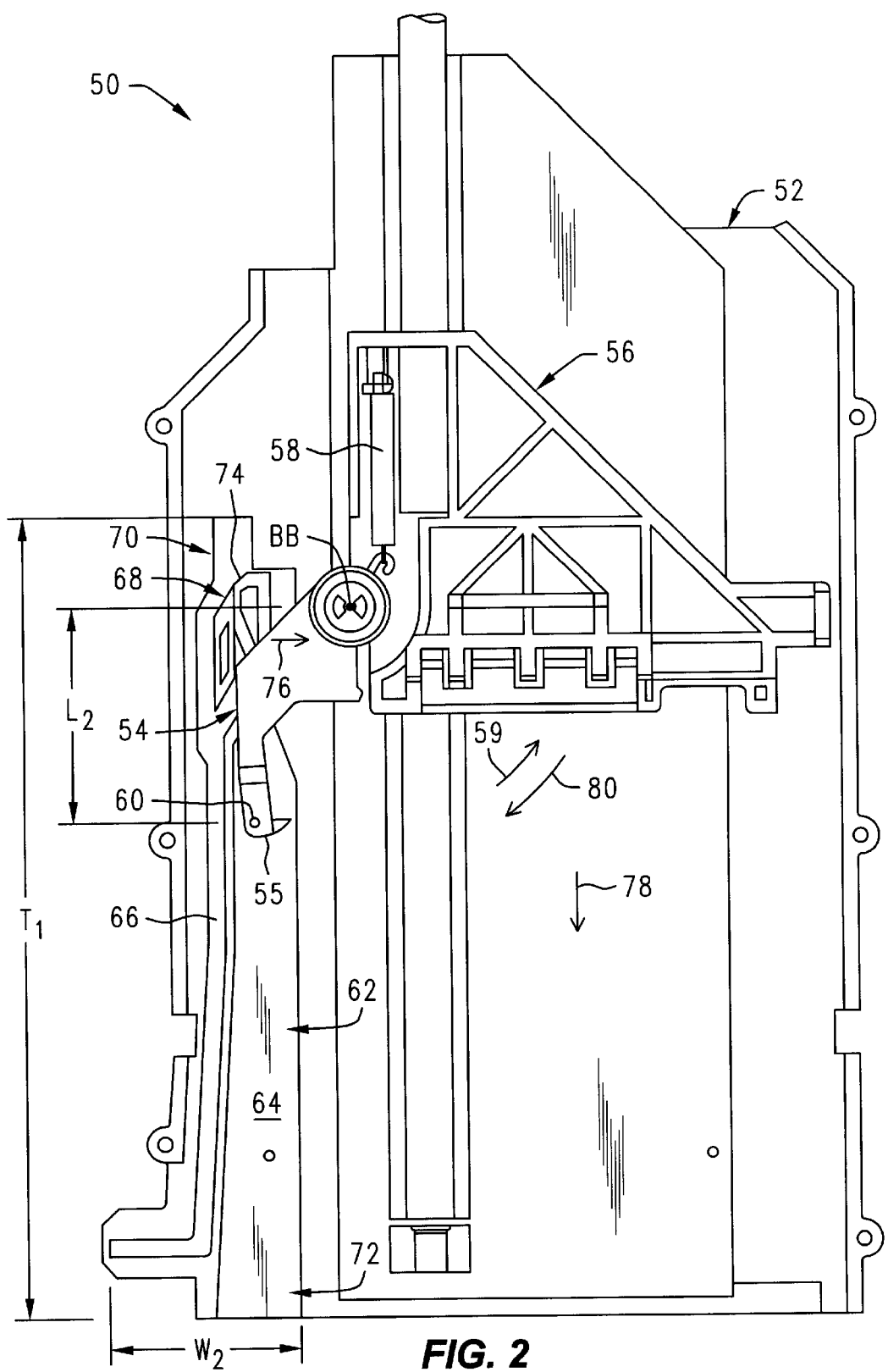
FIG. 2 is a top plan view of a one-finger cartridge engaging assembly whereby the finger is attached to the thumb.

FIG. 2 illustrates a cartridge engaging assembly 50 of the type shown in U.S. patent application Ser. No. 08/641,442, which was incorporated by reference above. The cartridge engaging assembly 50 comprises a guide sleeve 52 and a finger member 54 which is pivotally mounted to a thumb member 56. A biasing spring 58 is provided which urges the finger member 54 inwardly toward the thumb member 56, in direction 59. The finger member 54 has a latch portion 55 which engages a notch in a cartridge (not shown), and is rotatable on the thumb member 56 around axis BB.

The finger member 54 is provided with a guide post 60 which is received within an elongate track 62 in the guide sleeve 52. The elongate track 62 has an inner branch 64 and an outer branch 66. Diversion of the finger member 54 guide post 60 from one branch to another is assisted by a one-way gate 68 which is positioned at the rear end 70 of the elongate track 62. The gate 68 includes a spring-loaded deflecting portion 74 which is deflectable in a linear direction 76. It should be noted that positioning the gate 68 at the rear end 70 of the elongate track 62, as opposed to the forward end 72, adds lengths to the overall assembly 50 since the finger member 54 guide post 60 must travel all the way back past the gate 68 in order divert from one branch to another (64, 66). Thus, the length $T_1$ of the elongate track 62 must be at least the length of a cartridge (not shown) plus the additional length required for the finger member 54 guide post 60 to go past or through the gate 68 and complete its diversion from one branch to another (64, 66).

The finger member 54 shown in FIG. 2 is relatively long compared to the finger members 14, 16 described above with reference to FIG. 1. In other words, the length $L_2$ between the center of the finger member guide post 60 and axis BB is relatively longer than the length $L_1$ between the center of the finger member guide post 24 and axis AA as shown in FIG. 1. During a particular operating mode, the finger member 54 guide post 60 travels along the outer branch 64 of the elongate track 62, and the thumb member 56 moves in a forward direction 78. As the finger member guide post 60 reaches the forward end 72 of the elongate track 62, the finger member 54 rotates around axis BB and splays outwardly 80. The relatively longer length $L_2$ of the finger member 54 causes the finger member 54 to splay farther outwardly than the finger members 14, 16 shown in FIG. 1. Thus, the width $W_2$ of the elongate track 62 at the forward end 72 of the guide sleeve 52 as shown in FIG. 2 must be relatively larger than the width $W_1$ of the first elongate track 28 at the forward end 34 of the guide sleeve 12 as shown in FIG. 1. In general, the longer the finger, the farther it splays outwardly, and thus the wider the elongate track must be. Also, the wider the elongate track, the wider the overall cartridge engaging assembly.

Figure 3:
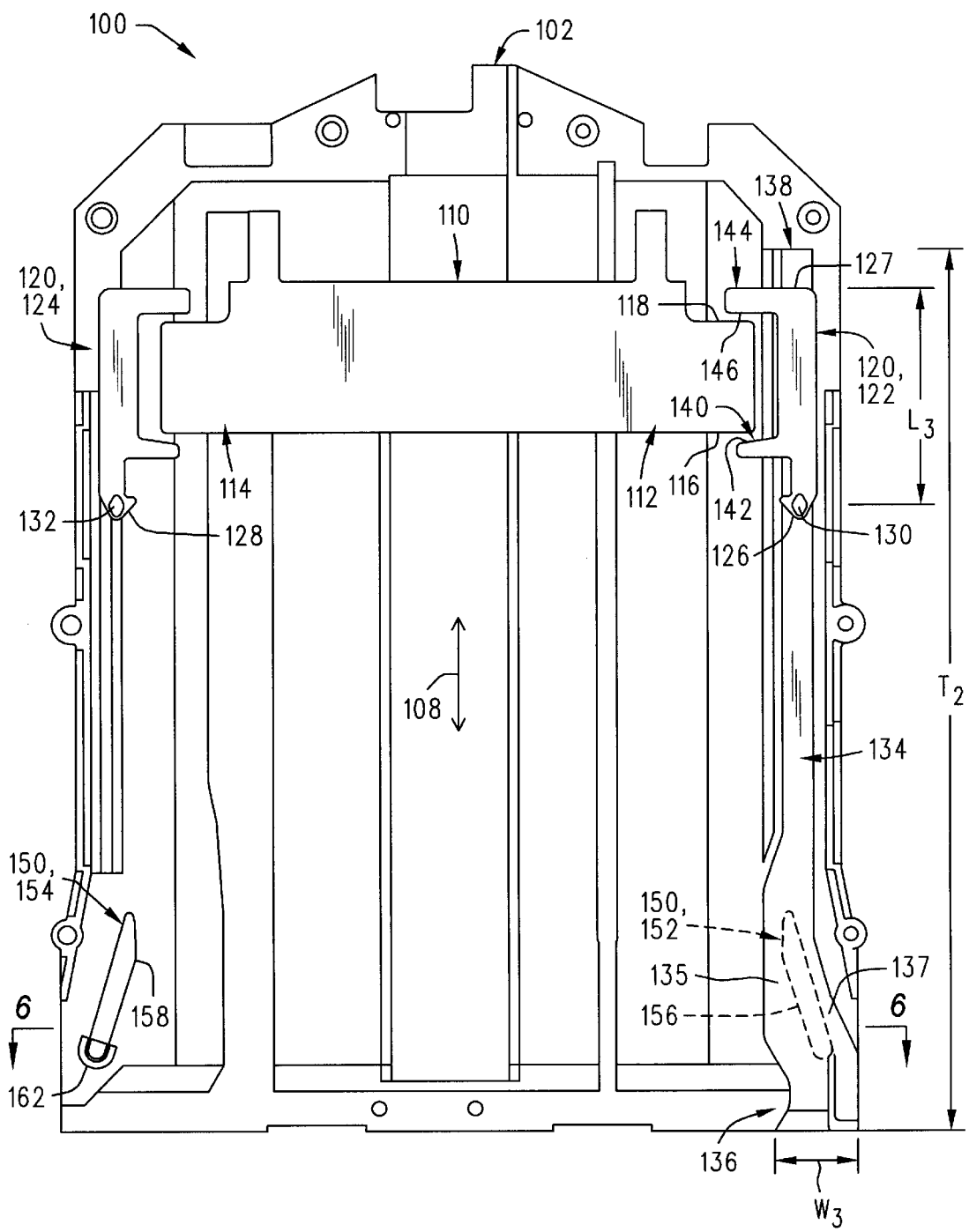
FIG. 3 is a top plan view of a cartridge engaging assembly of the present invention.

FIG. 3 illustrates a cartridge engaging assembly 100 of the present invention. The cartridge engaging assembly 100 may comprise a first guide sleeve 102 and a preferably identical second guide sleeve 104 (only partially shown in FIG. 6). The second guide sleeve 104 is adapted to fit over the first guide sleeve 102. It is to be understood that the description below of the first guide sleeve 102 applies equally to the second guide sleeve 104.

The cartridge engaging assembly 100 may further comprise a laterally extending thumb member 110 adapted to abuttingly engage a cartridge 106, FIGS. 9–13. The thumb member 110 comprises a first side 112 and a second side 114. On each side, e.g., 112, of the thumb member 110, there is a first generally laterally extending surface 116 and a second generally laterally extending surface 118. The thumb member 110 is operationally attached to a drive assembly (not shown) which is adapted to translate the thumb member 110 in a longitudinal direction 108. The drive assembly may be of the type described in the above-referenced patents or patent application, or may be any drive assembly commonly known in the art.

The cartridge engaging assembly 100 may further comprise a finger assembly 120. The finger assembly 120 is "floating" in that it is completely detached from the thumb member 110, unlike the fingers described above with reference to FIGS. 1 and 2. As shown in FIG. 3, the finger assembly 120 may comprise a first finger member 122 located adjacent to the thumb member 110 first side 112, and a substantially identical second finger member 124 located adjacent to the thumb member 110 second side 114. It is to be understood that, while a two-finger cartridge handling assembly 100 is shown and described, the present invention may be adapted to be either a two-finger cartridge handling assembly such as that shown in FIG. 1, or a one-finger cartridge handling assembly such as that shown in FIG. 2. With regard to a two-finger cartridge handling assembly 100, the description below with respect to the first finger member 122 applies equally to the second finger member 124, except where otherwise noted.

Figure 4:
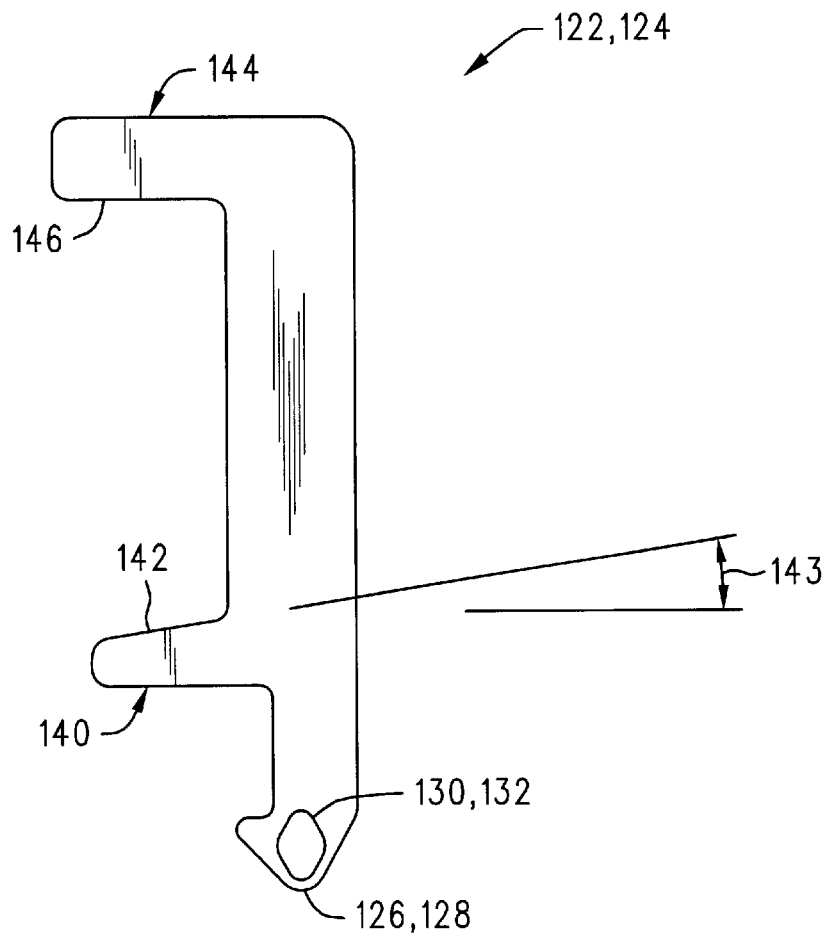
FIG. 4 is a top plan view of a finger member from the cartridge engaging assembly of FIG. 3.
Figure 5:
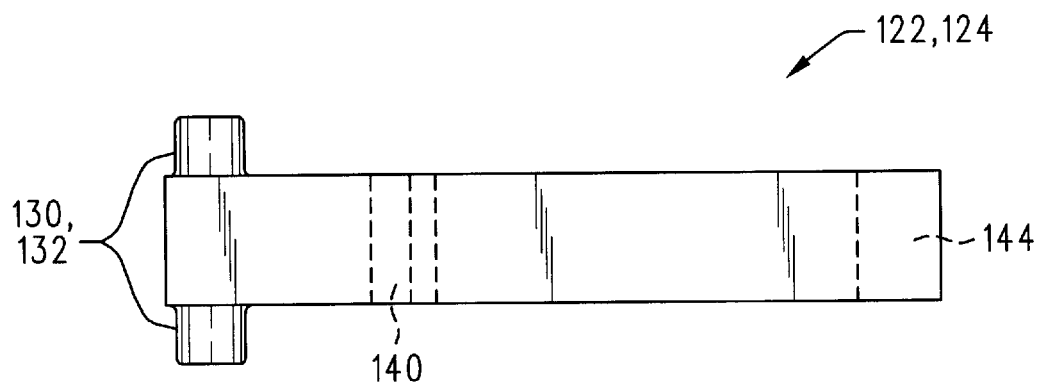
FIG. 5 is a side elevational view of the finger member of FIG. 4.

As best shown in FIGS. 4 and 5, each finger member 122, 124 may comprise a latch portion 126, 128 to which a guide post 130, 132 is attached. The guide post 130, 132 preferably extends above and below the latch portion 126, 128 as shown in FIG. 5. The first finger member 122 guide post 130 is adapted to be received within an elongate track 134 (FIG. 3) in the first guide sleeve 102. The second finger member 124 guide post 132 is adapted to be received within an identical elongate track (not shown) in the second guide sleeve 104. Each finger member 122, 124 may further comprise a substantially laterally extending front portion 140 comprising a first inner surface 142, and a substantially laterally extending rear portion 144 comprising a second inner surface 146. As shown in FIG. 3, the finger member first inner surface 142 is abuttingly engageable with the thumb member 110 first surface 116, and the finger member second inner surface 146 is abuttingly engageable with the thumb member 110 second surface 118. For reasons described below with respect to FIG. 9 and the get operating mode, the finger member first inner surface 142 is preferably oriented at an angle 143 (FIG. 4) to the finger member second inner surface 146.

The guide sleeves 102, 104 (and elongate tracks, e.g., 134) may be constructed from a high-strength yet lightweight material such as polycarbonate with 15% carbon fiber. The finger members 122, 124 and thumb member 110 may also be constructed from a high-strength yet lightweight material such as nylon with 30% carbon fiber and 15% PTFE. The different, yet compatible, materials used for the guide sleeves and finger members/thumb member allows these components to slidingly engage during normal operation with a minimum of wear.

As shown in FIG. 3, the guide sleeve 102 elongate track 134 may comprise a forward end 136, a rear end 138, an inner branch 135, an outer branch 137, and a width $W_3$. Unlike the cartridge engaging assemblies 10, 50 of FIGS. 1 and 2, the width $W_3$ of the elongate track 134 is completely independent of the length $L_3$ of the finger (which, for comparison purposes, is measured from the center of the finger member guide post 130 to the end 127 of the finger member 122).

The cartridge handling assembly 100 may further comprise a gate assembly 150. The gate assembly 150 may comprise a first gate 152 which is attached to the second guide sleeve (104, FIG. 6) but extends into the first guide sleeve 102 elongate track 134 at the forward end 136 thereof. The gate assembly 150 may also comprise a substantially identical second gate 154 attached to the first guide sleeve 102 and positioned within the second guide sleeve elongate track (not shown) at the forward end thereof. The description below of the first gate 152 applies equally to the second gate 154, except where otherwise noted.

Positioning the gate 152 at the forward end 136 of the elongate track 134, as opposed to the rear end 138, minimizes the length $T_2$ of the elongate track 134. That is, the finger member 122 guide post 130 can be diverted from the inner branch 135 to the outer branch 137 (or vice-versa) of the elongate track 134 without traveling an extra distance to reach the gate 152, as opposed to the gate 68, FIG. 2, shown and described above. Thus, the length $T_2$ of the elongate track 134 shown in FIG. 3 is less than the length $T_1$ of the elongate track 62 shown in FIG. 2.

The gate 152, FIG. 3, preferably comprises a flexible gate member 156 which is compressible and rotatable as described in further detail below with respect to the operating modes. As best shown in FIG. 6, the flexible gate member 156 may be attached to the second guide sleeve 104 with an attachment member 160 which may be integrally formed with or otherwise fixedly attached to the second guide sleeve 104. As shown in FIG. 3, the flexible gate member 156 extends onto and is positioned entirely within the elongate track 134 in the first guide sleeve 102, unlike the gate member 40 shown in FIG. 1 which is attached to the guide sleeve 12 at the outer side thereof. Similarly, the second gate 154 also comprises a preferably identical flexible gate member 158 which may be attached to the first guide sleeve 102 with an attachment member 162 (FIGS. 3 and 6). As shown in FIG. 7, each of the flexible gate members 156, 158 may be comprised of a thin, elongate strip of material such as plastic or steel with a first end 164, a second end 166, and a middle portion 165. Each attachment member 160, 162 may comprise a groove 168, 169 which is adapted to receive the ends 164, 166 of the flexible gate member 156, 158 to form a loop and securely hold the flexible gate member 156, 158 when the guide sleeves 102, 104 (FIG. 6) are attached to one another. The middle portion 165 of the flexible gate member 158 (i.e., the portion of the flexible gate member 158 which is not secured to the attachment member 162) is free to be compressed and/or rotated as necessary during particular operating modes as described in further detail below. It can be seen that the flexible gate member 156, 158 functions as a biasing device, i.e., no additional biasing devices are necessary, unlike the gate 68 shown in FIG. 2 and described above.

FIGS. 8A, 8B and 9–12 illustrate the operating modes of the cartridge engaging assembly 100. In these figures, the operation of only one of the finger members 122 will be described with the understanding that the operation of the other finger member 124 is substantially identical.

Figure 8A:
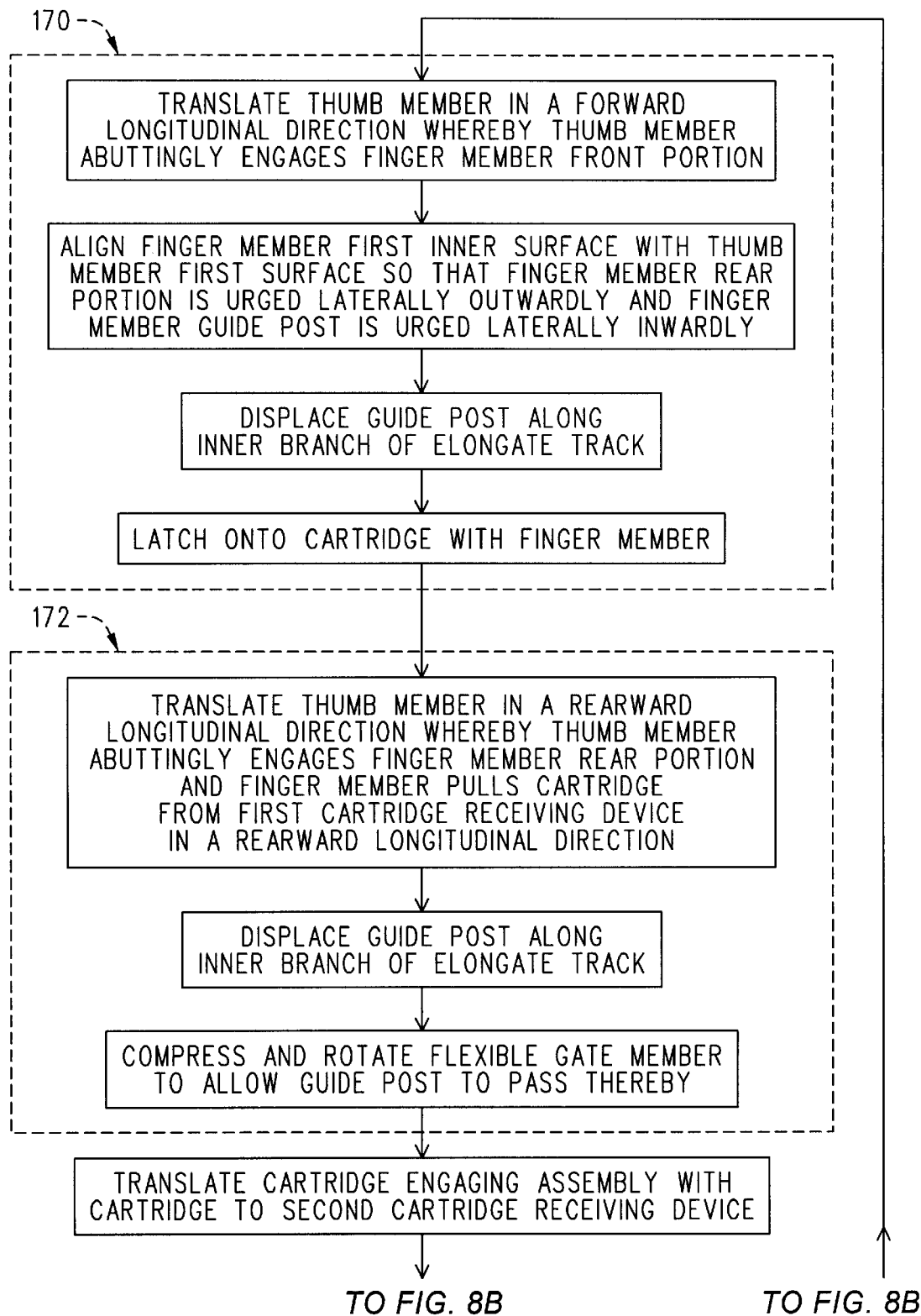
FIG. 8A is a flow chart illustrating a method of translating a cartridge with the cartridge engaging assembly of FIG. 3.
Figure 8B:
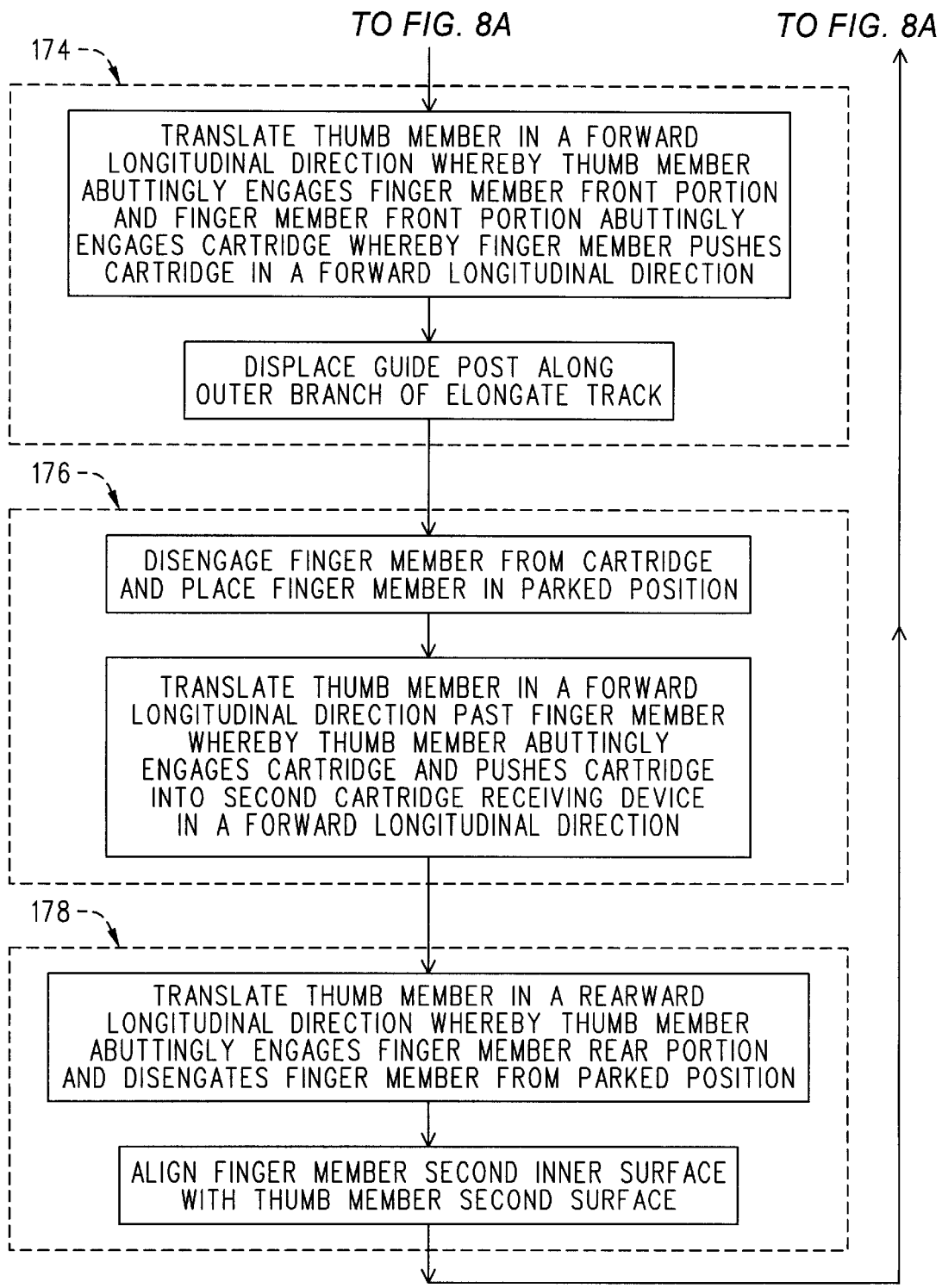
FIG. 8B is a continuation of the flow chart of FIG. 8A.
Figure 10:
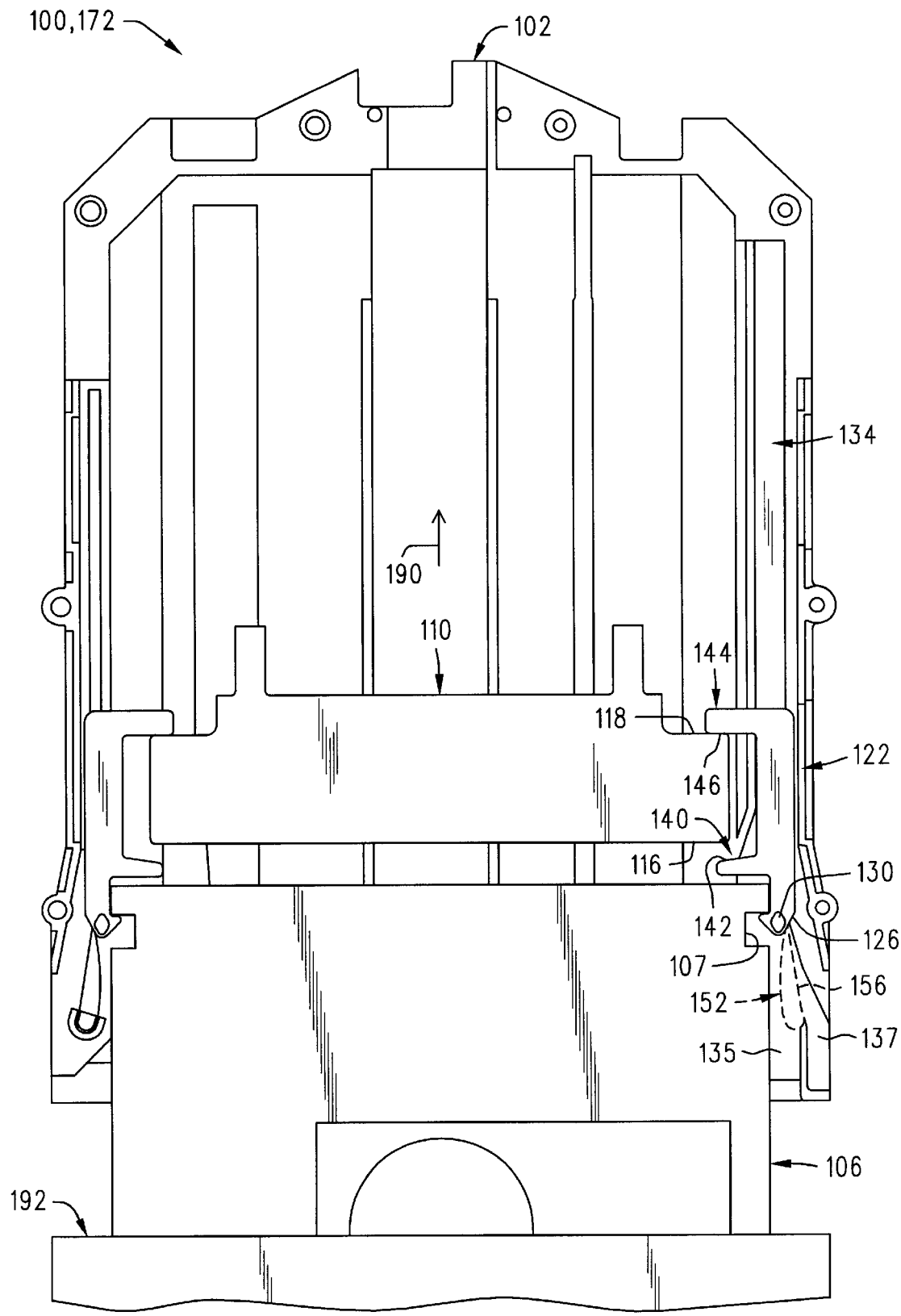
FIG. 10 is a top plan view of the cartridge engaging assembly of FIG. 3 in a first retrieve operating mode.
Figure 11:
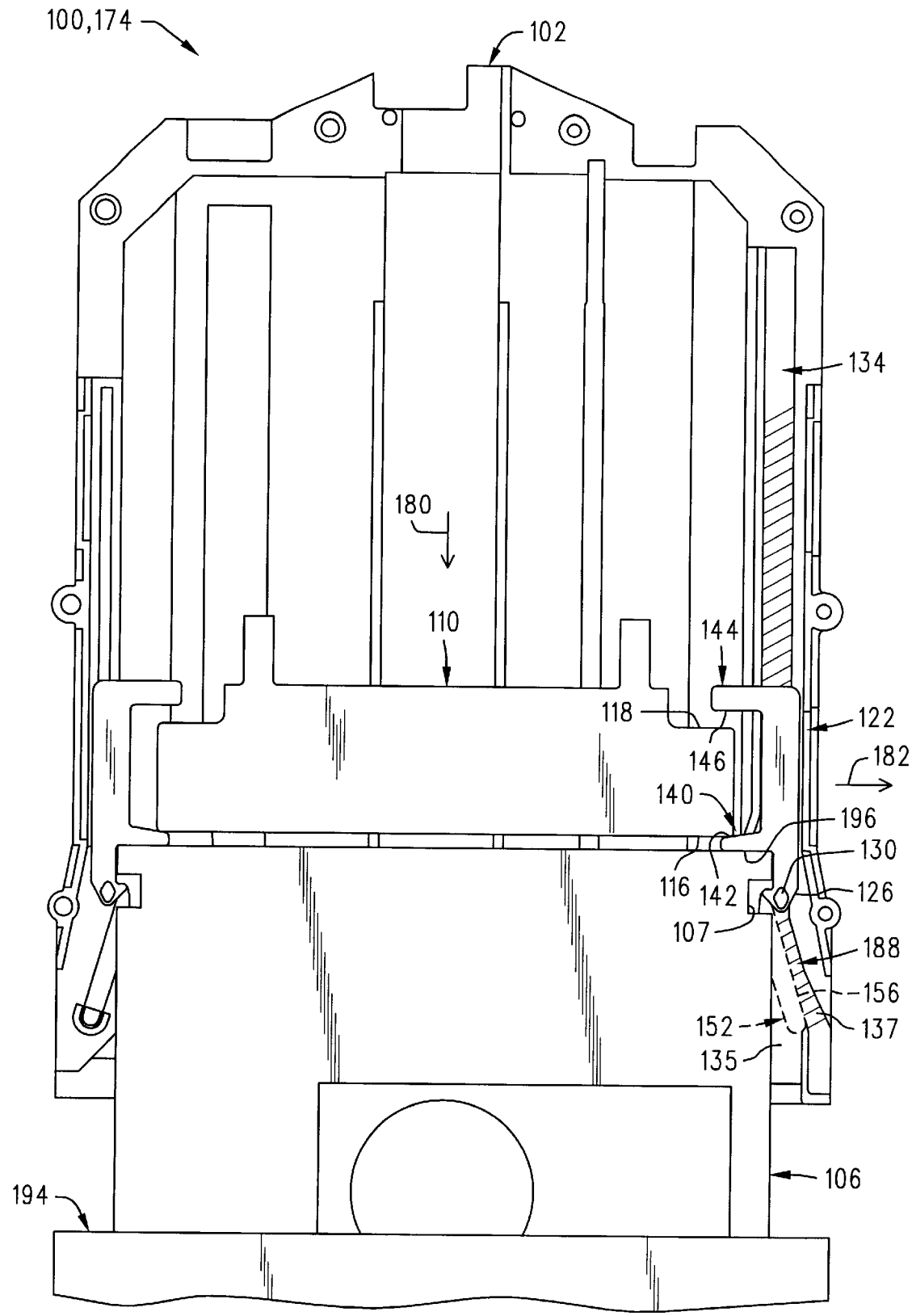
FIG. 11 is a top plan view of the cartridge engaging assembly of FIG. 3 in a first put operating mode.

FIGS. 8A and 8B illustrate a method of translating a cartridge (106, FIGS. 9–15) with the cartridge engaging assembly (100, FIGS. 3 and 9–15) of the present invention from a first cartridge receiving device (192, FIGS. 9–10) such as a cartridge storage location or read/write drive to a second cartridge receiving device (194, FIG. 11). The method comprises operating the cartridge engaging assembly in a get operating mode 170, a first retrieve operating mode 172, a first put operating mode 174, a second put operating mode 176, and a second retrieve operating mode 178, which will each be described in further detail below. In between the first retrieve operating mode 172 and the first put operating mode 174, the cartridge engaging assembly and cartridge may be translated to the second cartridge receiving device 194 (FIG. 11).

Figure 9:
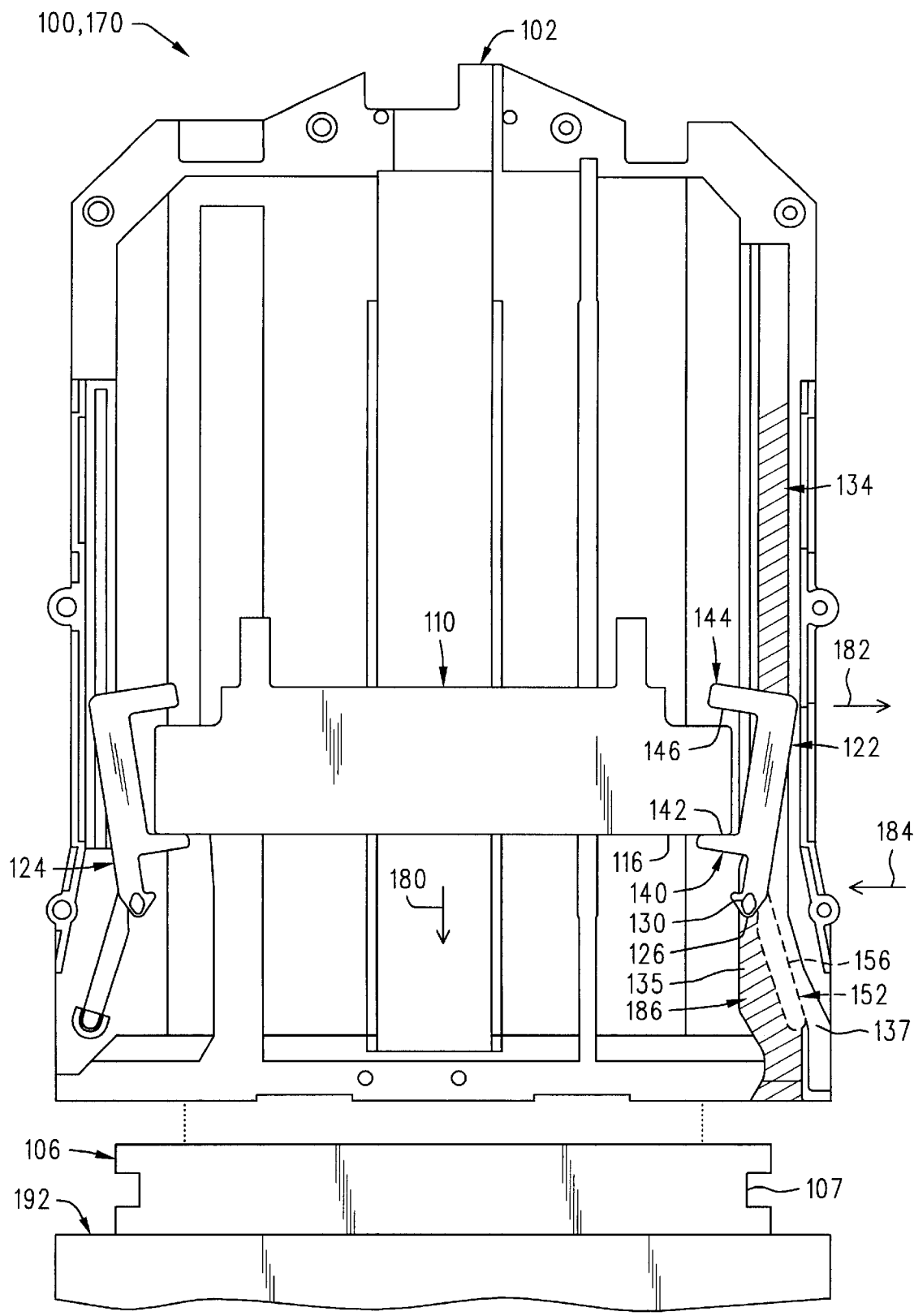
FIG. 9 is a top plan view of the cartridge engaging assembly of FIG. 3 in a get operating mode.

As shown in FIG. 9, the cartridge engaging assembly 100 may comprise a get operating mode 170 (FIG. 8A) whereby the assembly 100 is going to "get" a cartridge 106. For illustrative purposes, the approximate path followed by the finger member 122 guide post 130 during the get operating mode 170 is indicated by hatching within the elongate track 134. In this operating mode, the thumb member 110 is positioned between the finger member 122 first and second inner surfaces 142, 146. The thumb member 110 is translated in a forward longitudinal direction 180, causing the thumb member first surface 116 to abuttingly engage the finger member front portion 140 at the first inner surface 142 thereof. As described above, the finger member first inner surface 142 is oriented at an angle 143 (FIG. 4) to the finger member second inner surface 144. The forward translation of the thumb member 110 causes the finger member first inner surface 142 to align with the thumb member first surface 116. As a result, the finger member rear portion 144 is urged laterally outwardly 182, and the finger member latch portion 126 and guide post 130 are urged laterally inwardly 184. This forces the guide post 130 to travel along the inner branch 135 of the elongate track 134 when it reaches the gate 152. In this operating mode, the gate 152 flexible member 156 is preferably out of the path of the finger member guide post 130. However, if necessary, the gate 152 flexible member 156 may be compressed and/or rotated out of the path of the guide post 130 to allow the guide post 130 to pass thereby. As the thumb member 110 travels forwardly 180 beyond the gate 152, the latch portion 126 of the finger member 122 abuttingly engages a cartridge 106 and latches onto a notch 107 in the cartridge 106.

As shown in FIG. 10, the cartridge engaging assembly 100 may further comprise a first retrieve operating mode 172 (FIG. 8A) whereby the assembly 100 "retrieves" a cartridge 106 into the assembly. In this operating mode, the thumb member 110 is positioned between the finger member 122 first and second inner surfaces 142, 146. The thumb member 110 is translated in a rearward longitudinal direction 190, causing the thumb member second surface 118 to abuttingly engage the finger member 122 rear portion 144 at the second inner surface 146 thereof. The latch portion 126 of the finger member 122 is engaged with the notch 107 in the cartridge 106, thus pulling the cartridge 106 from the first cartridge receiving device 192 in a rearward longitudinal direction 190. The finger member guide post 130 travels approximately the same path on the elongate track 134 as shown in FIG. 9. As shown in FIG. 10, as the latch portion 126 and guide post 130 pass the gate 152, the gate flexible member 156 may be compressed and/or rotated out of the path of the guide post 130 as necessary for the guide post 130 to pass thereby.

In between the first retrieve operating mode 172 (FIG. 8A) and the first put operating mode 174 (FIG. 8B, described below), the cartridge engaging assembly 100 with the cartridge 106 may be translated to a second cartridge receiving device 194 (FIGS. 11–13) such as a cartridge storage location or read/write drive. The cartridge engaging assembly 100 may be translated to this new location using a drive assembly of the type described in the above-referenced patents or patent application, or any drive assembly commonly known in the art. The cartridge 106 may also be flipped, if necessary, with a drive assembly (not shown) that is adapted to flip a cartridge engaging assembly 100.

As shown in FIG. 11, the cartridge engaging assembly 100 may further comprise a first put operating mode 174 (FIG. 8B) whereby the assembly 100 goes to "put" a cartridge 106 into a cartridge receiving device 194 such as a cartridge storage location or a read-write drive. For illustrative purposes, the approximate path followed by the finger member guide post 130 during the first put operating mode 174 is indicated by hatching within the elongate track 134. In this operating mode, the thumb member 110 is positioned between the finger member 122 first and second inner surfaces 142, 146. The thumb member 110 is translated in a forward longitudinal direction 180, causing the thumb member first surface 116 to abuttingly engage the finger member 122 front portion 140 at the first inner surface 142 thereof. The finger member 122 comprises a generally laterally extending outer surface 196 on the front portion 140 thereof which abuttingly engages the cartridge 106, pushing the cartridge 106 as the thumb member 110 is translated in a forward longitudinal direction 180. It can be seen from a comparison of FIGS. 8 and 10 that when a finger member 122 is engaged with a cartridge 106 as shown in FIG. 10, the entire finger member 122 is positioned farther laterally outwardly 182 as compared to the position of the finger member 122 without a cartridge 106 as shown in FIG. 9. When the latch portion 126 and guide post 130 reach the gate 152, the laterally outward position of the finger member 122 causes the guide post 130 to travel along the outer branch 137 of the elongate track 134. In this operating mode, the gate 152 flexible member 156 is preferably out of the path of the finger member guide post 130. However, if necessary, the gate 152 flexible member 156 may be compressed and/or rotated out of the path of the guide post 130 to allow the guide post 130 to pass thereby.

Figure 12:
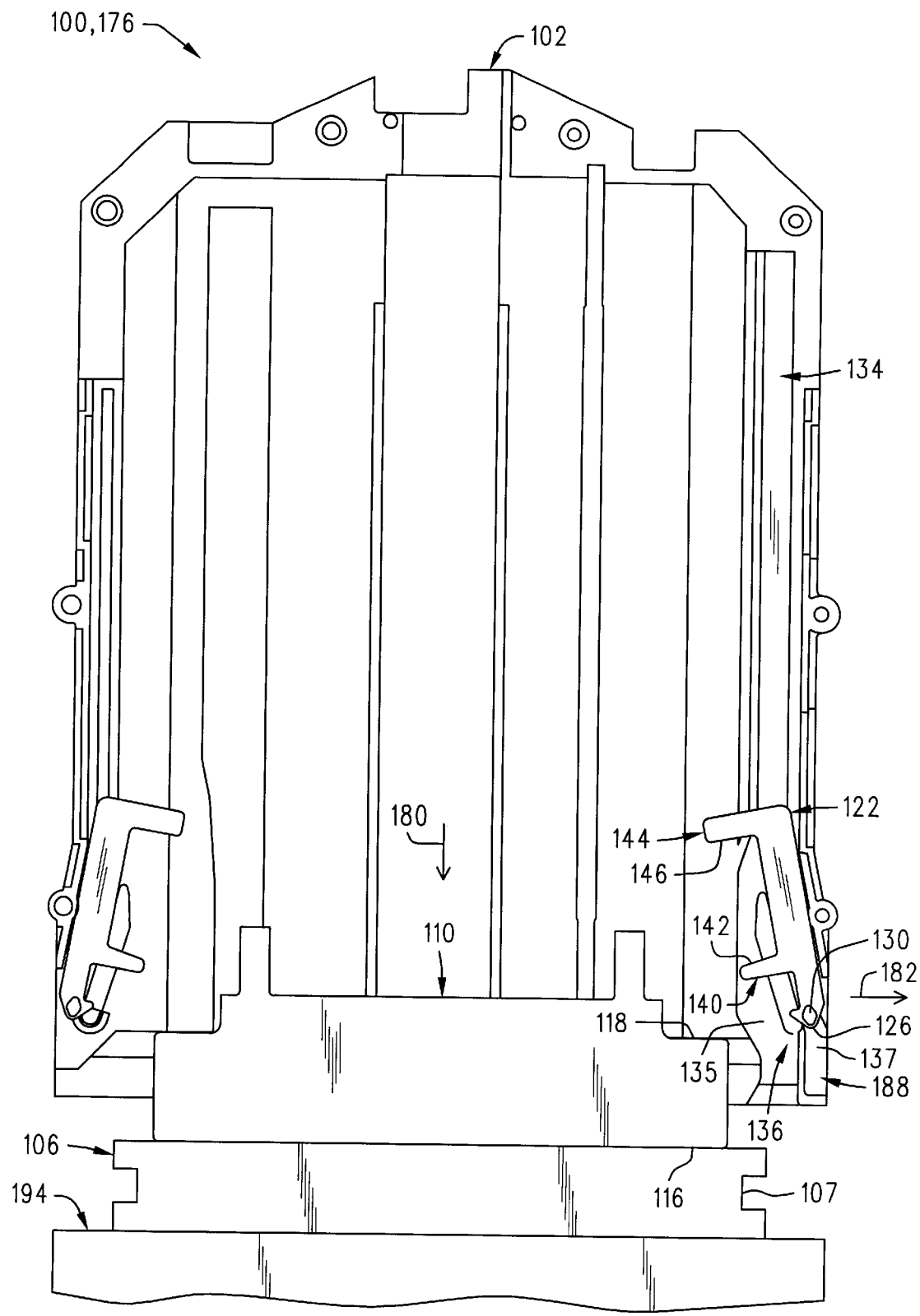
FIG. 12 is a top plan view of the cartridge engaging assembly of FIG. 3 in a second put operating mode.

As shown in FIG. 12, the cartridge engaging assembly 100 may further comprise a second put operating mode 176 (FIG. 8B). As the finger member guide post 130 travels along the outer branch 137 of the elongate track 134, the finger member front portion 140 moves laterally outwardly 182. This causes the finger member latch portion 126 to disengage from the notch 107 in the cartridge 106, and the thumb member 110 first surface 116 to disengage from the finger member first inner surface 142. At this point, the finger member 122 is placed in a parked position at the forward end 136 of the elongate track as shown in FIG. 12, awaiting return of the thumb member 110. The thumb member 110 continues to move in a forward longitudinal direction 180 and abuttingly engages the cartridge 106, pushing the cartridge 106 into a second cartridge receiving device 194.

The width $W_3$ (FIG. 3) of the elongate track 134 is directly proportional to the laterally outward 182 (FIG. 12) movement of the finger member front portion 140 described above which allows the finger member 122 to release the cartridge 106. The lateral space required by the slight lateral movement of a floating finger 122 is usually considerably less than the lateral space required for a relatively long finger 54, FIG. 2, to rotate and splay outwardly with the forward movement of the thumb member, i.e., $W_3$ (FIG. 3) is smaller than $W_2$ (FIG. 2). Therefore, a relatively long finger, e.g., 54, FIG. 2, may be utilized in the present invention without any change to the elongate track 134.

Figure 13:
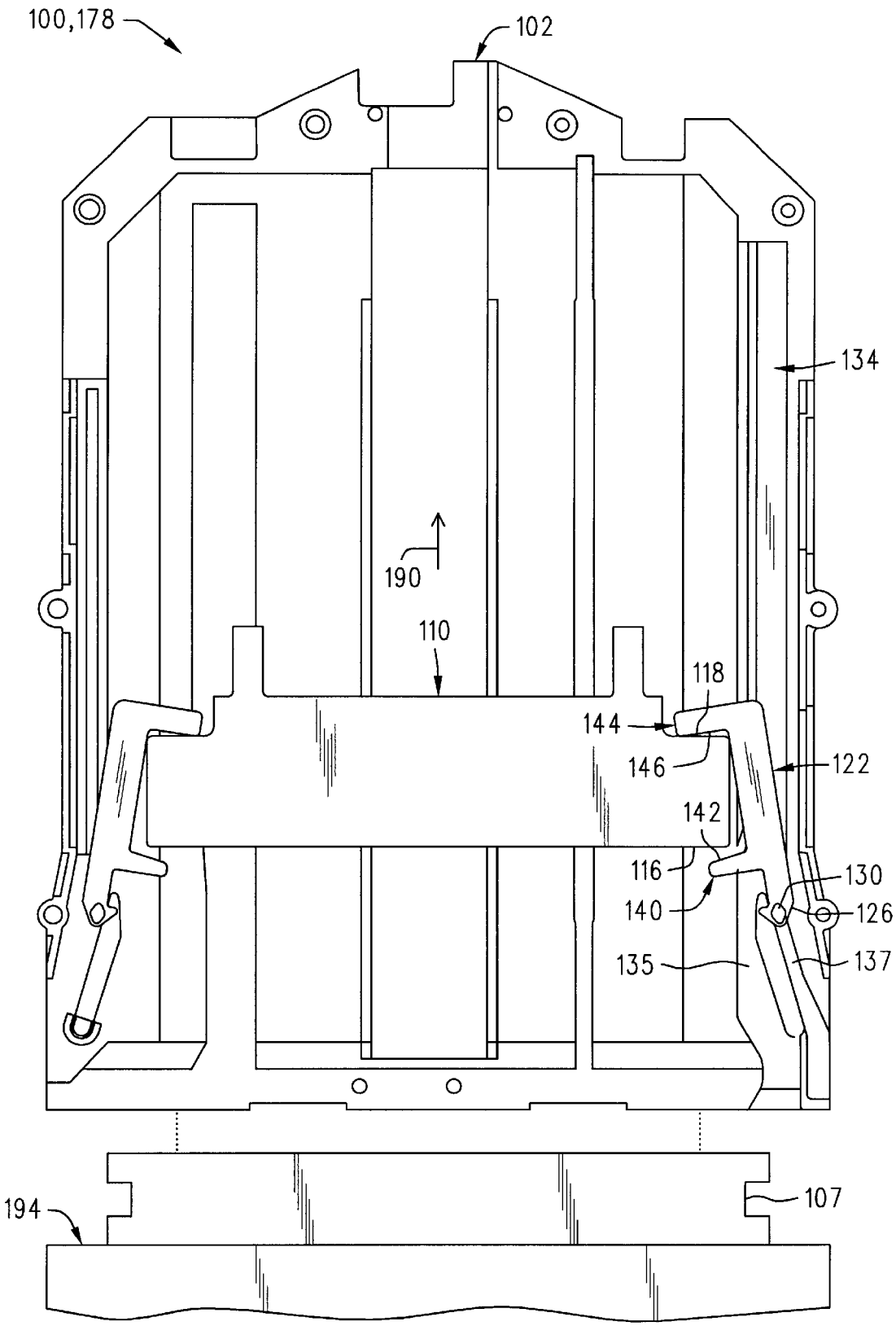
FIG. 13 is a top plan view of the cartridge engaging assembly of FIG. 3 in a second retrieve operating mode.

As shown in FIG. 13, the cartridge engaging assembly 100 may further comprise a second retrieve operating mode 178 (FIG. 8B) whereby the assembly 100 "retrieves" the finger members and goes back to its original position prior to entering into the get operating mode 170 (FIG. 8A). In this operating mode, the thumb member 110 is translated in a rearward longitudinal direction 190. The thumb member second surface 118 abuttingly engages the finger member 122 rear portion 144 at or near the second inner surface 146 thereof, causing the finger member 122 to be released from the parked position shown in FIG. 12. The finger member guide post 130 travels approximately the same path on the elongate track 134 as shown in FIG. 11. As the thumb member 110 continues to be translated rearwardly 190, the finger member second inner surface 146 aligns with the thumb member second surface 118. At this point, the thumb member 110 is positioned between the finger member 122 first and second inner surfaces 142, 146. When the second retrieve operating mode 178 (FIG. 8B) is complete, the cartridge engaging assembly 100 is ready to move to another cartridge receiving location and enter into the get operating mode 170 (FIG. 8A), as shown by the return arrow in FIGS. 8A and 8B.

FIGS. 14–17 illustrate a floating finger member 200 with built-in recovery devices 202, 204 should a finger member become displaced. The finger member 200 may be substantially identical to the finger members 122, 124 described above with reference to FIGS. 3–13. The finger member 200 may comprise a generally laterally extending front portion 206 with a first inner surface 208 and a first outer surface 210, and generally laterally extending rear portion 212 with a second inner surface 214 and a second outer surface 216. Again, as with finger members 122, 124 described above, the first inner surface 208 is preferably oriented at an angle to the second inner surface 214.

Figure 14:
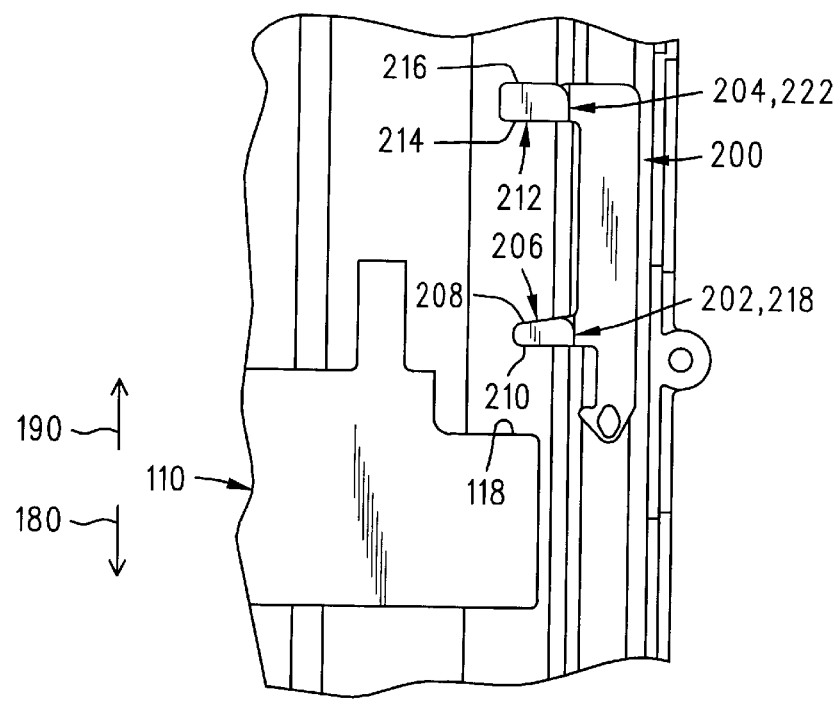
FIG. 14 is a top plan view of a finger member with recovery devices in a first displaced state relative to a thumb member.
Figure 15:
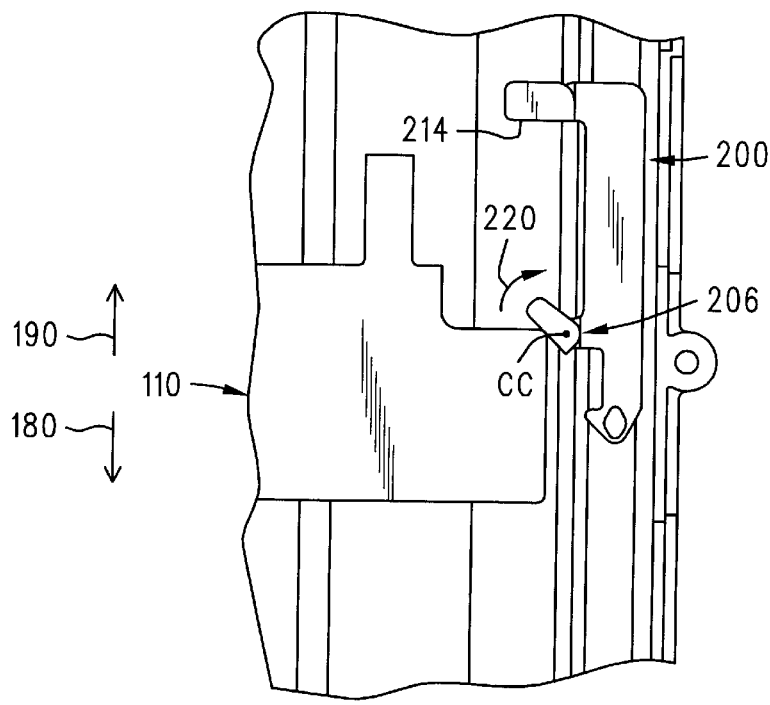
FIG. 15 is a top plan view of the finger member of FIG. 14 being recovered.

FIGS. 14–15 show a finger member 200 in a first displaced state whereby somehow the thumb member 110 has moved forwardly 180 without a finger member 200. When the thumb member 110 is translated in a rearward longitudinal direction 190, the thumb member 110 second laterally extending surface 118 will contact the finger member first outer surface 210. The front recovery device 202 may be comprised of a one-way hinge member 218 on the front portion 206 of the finger member 200 which allows the front portion 206 to rotate inwardly 220 on an axis CC (FIG. 15). As the thumb member 110 continues to be translated in a rearward longitudinal direction 190, the hinged front portion 206 of the finger member 200 will rotate out of the way as shown in FIG. 15 and allow the thumb member 110 to pass thereby. The thumb member 110 second surface 118 will then abuttingly engage the finger member second inner surface 214 and thereby "recover" the finger member 200.

Figure 16:
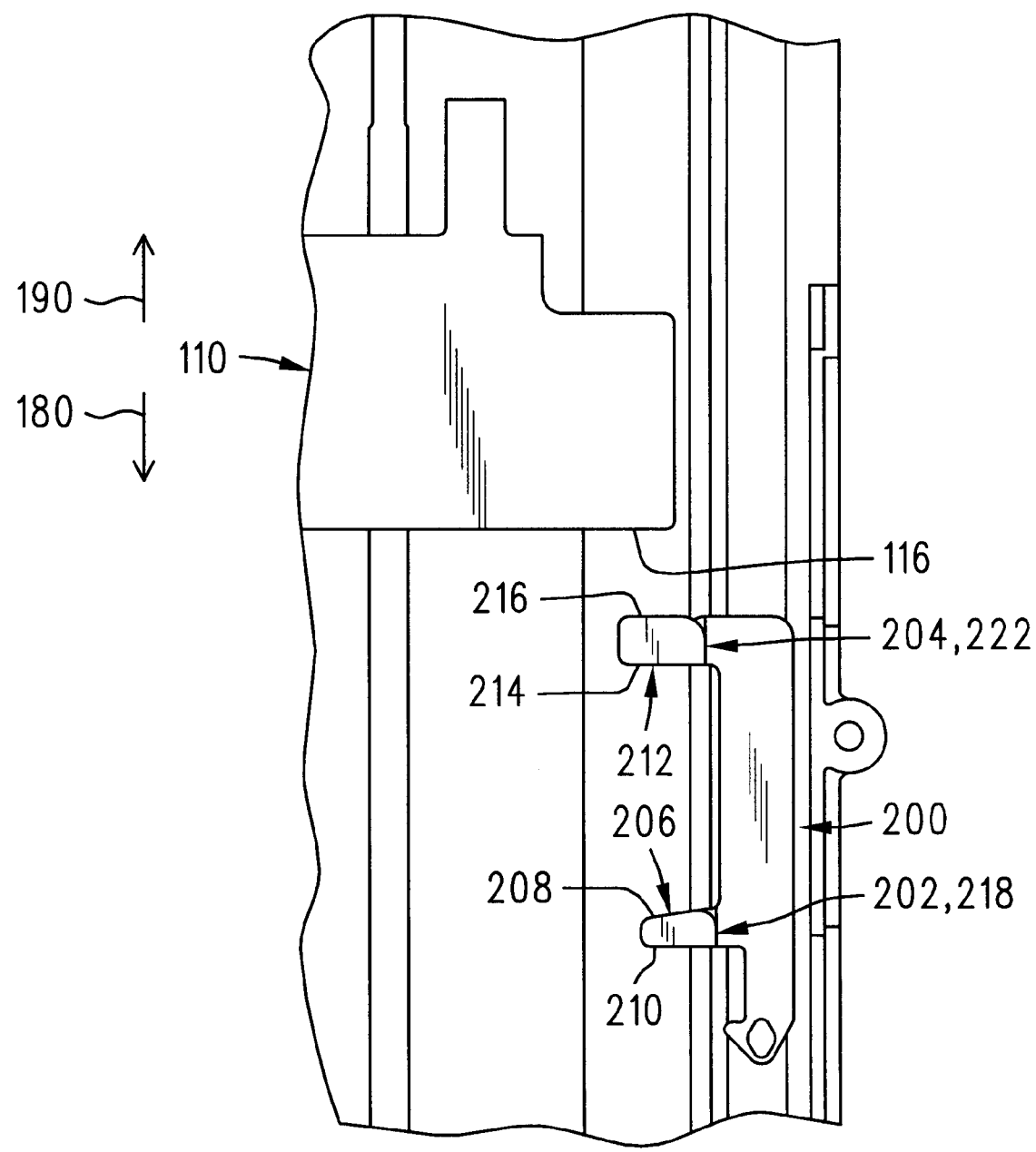
FIG. 16 is a top plan view of a finger member with recovery devices in a second displaced state relative to a thumb member.
Figure 17:
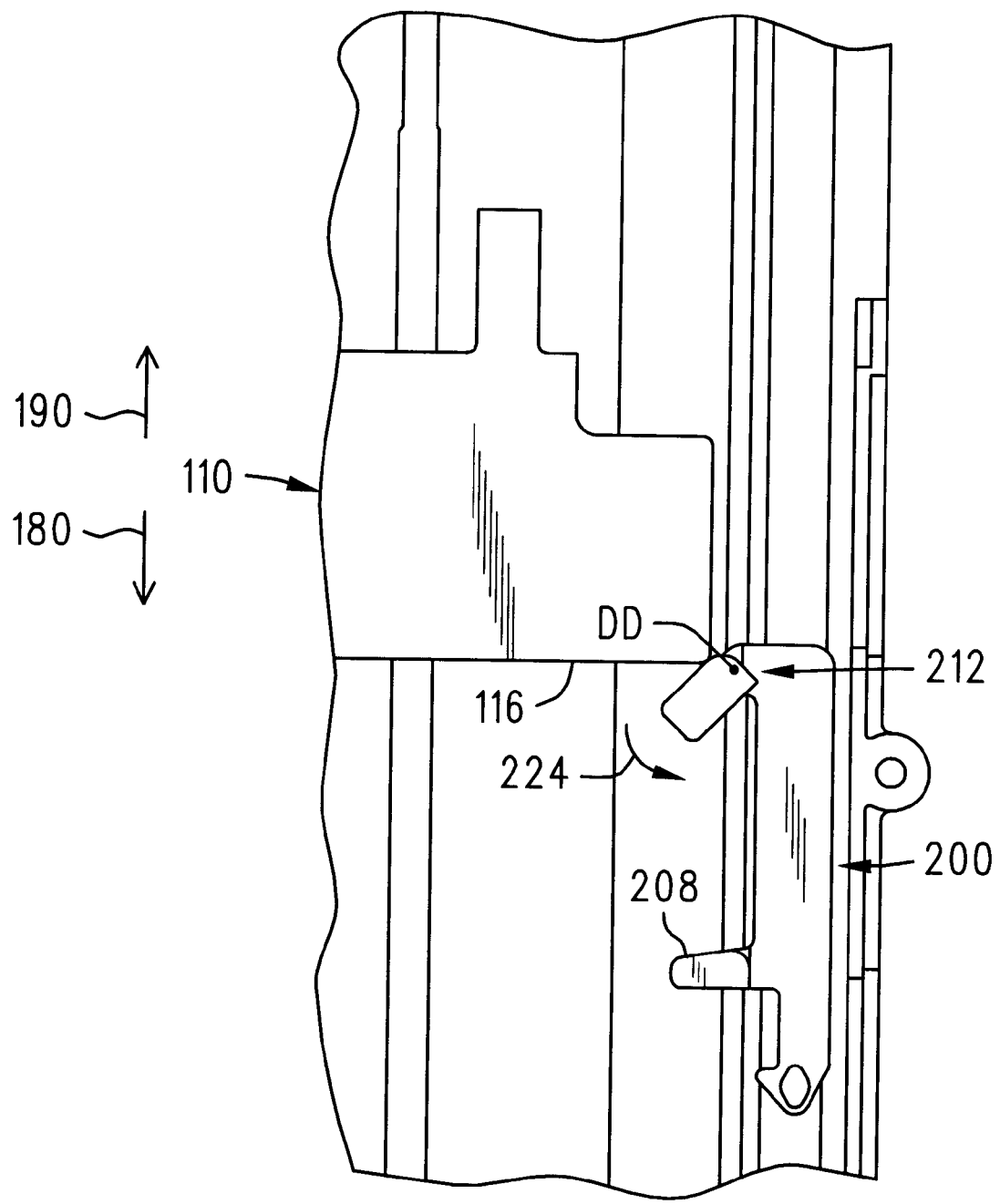
FIG. 17 is a top plan view of the finger member of FIG. 16 being recovered.

FIGS. 16–17 show a finger member 200 in a second displaced state whereby somehow the thumb member 110 has moved rearwardly 190 without the finger member 200. When the thumb member 110 is translated in a forward longitudinal direction 180, the thumb member 110 first laterally extending surface 116 will contact the finger member second outer surface 216. The rear recovery device 204 may be comprised of a one-way hinge member 222 on the rear portion 212 of the finger member 200, which may be substantially identical to the one-way hinge member 218 on the front portion 206 of the finger member, which allows the rear portion 212 to rotate inwardly 224 on an axis DD (FIG. 17). As the thumb member 110 continues to be translated in a forward longitudinal direction 180, the hinged rear portion 212 of the finger member 200 will rotate out of the way as shown in FIG. 17 and allow the thumb member 110 to pass thereby. The thumb member 110 first surface 116 will then abuttingly engage the finger member first inner surface 208 and thereby "recover" the finger member 200.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

I claim:

1. A cartridge engaging assembly for translating a cartridge, comprising:
    a) a laterally extending thumb member adapted to abuttingly engage said cartridge, said thumb member comprising a first surface and a second surface;
    b) a floating finger assembly which is detached from said thumb member and is adapted to engage said cartridge, said finger assembly comprising at least one guide post, at least one substantially laterally extending front portion abuttingly engageable with said thumb member first surface, and at least one substantially laterally extending rear portion abuttingly engageable with said thumb member second surface;
    c) at least one guide sleeve comprising an elongate track adapted to receive said guide post, said elongate track comprising a forward end, a rear end, an inner branch and an outer branch; and
    d) a gate assembly positioned within said elongate track at said forward end thereof.

2. The cartridge engaging assembly of claim 1, wherein said finger assembly comprises at least one finger member comprising said front portion which comprises a first inner surface, said rear portion which comprises a second inner surface, and a latch portion adapted to engage said cartridge, said guide post being attached to and extending from said latch portion.

3. The cartridge engaging assembly of claim 2, wherein said finger member first inner surface is oriented at an angle to said finger member second inner surface.

4. The cartridge engaging assembly of claim 2, wherein:
    a) said finger member front portion further comprises a first outer surface;
    b) said finger member rear portion further comprises a second outer surface; and
    c) at least one of said front portion and said rear portion comprises a recovery device comprising a one-way hinge member which allows said thumb member to pass thereby when said thumb member abuttingly engages either said finger member first outer surface or said finger member second outer surface, but does not allow said thumb member to pass thereby when said thumb member abuttingly engages either said finger member first inner surface or said finger member second inner surface.

5. The cartridge engaging assembly of claim 1, wherein said gate assembly comprises at least one flexible gate member secured to said elongate track with an attachment member, said flexible gate member is compressible and rotatable, and said flexible gate member is positioned entirely within said elongate track.

6. The cartridge engaging assembly of claim 5, wherein said flexible gate member is comprised of a thin, elongate strip of material with a first end, a second end, and a compressible and rotatable middle portion, and said attachment member comprises a groove which is adapted to receive said ends of said flexible gate member to form a loop and securedly hold the flexible gate member.

7. The cartridge engaging assembly of claim 6 wherein said material is steel or plastic.

8. The cartridge engaging assembly of claim 1, further comprising:
    a) a get operating mode whereby said thumb member is translated in a forward longitudinal direction, said thumb member first surface abuttingly engages said finger assembly front portion, and said finger assembly engages said cartridge;
    b) a first retrieve operating mode whereby said finger assembly is engaged with said cartridge, said thumb member is translated in a rearward longitudinal direction, and said thumb member second surface abuttingly engages said finger assembly rear portion;
    c) a first put operating mode whereby said finger assembly is engaged with said cartridge, said thumb member is translated in a forward longitudinal direction, and said thumb member first surface abuttingly engages said finger assembly front portion;
    d) a second put operating mode whereby said thumb member is translated in a forward longitudinal direction, said finger assembly is placed in a parked position at said elongate track forward end and disengages from said cartridge, and said thumb member first surface disengages from said finger assembly front portion; and
    e) a second retrieve operating mode whereby said thumb member is translated in a rearward longitudinal direction and said thumb member second surface abuttingly engages said finger assembly rear portion causing said finger assembly to be released from said parked position.

9. The cartridge engaging assembly of claim 8, wherein:
    a) said finger assembly comprises at least one finger member comprising said front portion which comprises a first inner surface, said rear portion which comprises a second inner surface, and a latch portion adapted to engage said cartridge;

b) said get operating mode further comprises whereby said thumb member first surface abuttingly engages said finger member first inner surface, said finger member first inner surface aligns with said thumb member first surface, and said thumb member is positioned between said finger member first inner surface and said finger member second inner surface;

c) said first retrieve operating mode further comprises said thumb member second surface abuttingly engages said finger member second inner surface, and said thumb member is positioned between said finger member first inner surface and said finger member second inner surface;

d) said first put operating mode further comprises whereby said thumb member first surface abuttingly engages said finger member first inner surface and said thumb member is positioned between said finger member first inner surface and said finger member second inner surface; and e) said second retrieve operating mode further comprises whereby said thumb member is positioned between said finger member first inner surface and said finger member second inner surface, and said finger member second inner surface aligns with said thumb member second surface.

10. A cartridge engaging assembly for translating a cartridge, comprising:

a) a laterally extending thumb member adapted to abuttingly engage said cartridge, said thumb member comprising a first surface and a second surface;

b) at least one floating finger member which is detached from said thumb member, said finger member comprising a latch portion adapted to engage said cartridge, at least one guide post attached to and extending from said latch portion, a substantially laterally extending front portion comprising a first inner surface which is abuttingly engageable with said thumb member first surface, and a substantially laterally extending rear portion comprising a second inner surface which is abuttingly engageable with said thumb member second surface;

c) at least one guide sleeve comprising an elongate track adapted to receive said guide post, said elongate track comprising a forward end, a rear end, an inner branch and an outer branch; and d) at least one flexible gate member which is compressible and rotatable and positioned entirely within said elongate track at said forward end thereof and secured to said elongate track with an attachment member.

11. The cartridge engaging assembly of claim 10, wherein said finger member first inner surface is oriented at an angle to said finger member second inner surface.

12. The cartridge engaging assembly of claim 10, wherein:

a) said finger member front portion further comprises a first outer surface;

b) said finger member rear portion further comprises a second outer surface; and c) at least one of said front portion and said rear portion comprises a recovery device comprising a one-way hinge member which allows said thumb member to pass thereby when said thumb member abuttingly engages either said finger member first outer surface or said finger member second outer surface, but does not allow said thumb member to pass thereby when said thumb member abuttingly engages either said finger member first inner surface or said finger member second inner surface.

13. The cartridge engaging assembly of claim 10, wherein said flexible gate member is comprised of a thin, elongate strip of material with a first end, a second end, and a compressible and rotatable middle portion, and said attachment member comprises a groove which is adapted to receive said ends of said flexible gate member to form a loop and securedly hold the flexible gate member.

14. The cartridge engaging assembly of claim 13 wherein said material is steel or plastic.

15. The cartridge engaging assembly of claim 10, further comprising:

a) a get operating mode whereby said thumb member is translated in a forward longitudinal direction, said thumb member first surface abuttingly engages said finger member first inner surface, said finger member first inner surface aligns with said thumb member first surface, said thumb member is positioned between said finger member first inner surface and said finger member second inner surface, and said finger member latch portion engages said cartridge;

b) a first retrieve operating mode whereby said finger member latch portion is engaged with said cartridge, said thumb member is translated in a rearward longitudinal direction, said thumb member second surface abuttingly engages said finger member second inner surface, and said thumb member is positioned between said finger member first inner surface and said finger member second inner surface;

c) a first put operating mode whereby said finger member is engaged with said cartridge, said thumb member is translated in a forward longitudinal direction, said thumb member first surface abuttingly engages said finger member first inner surface, and said thumb member is positioned between said finger member first inner surface and said finger member second inner surface;

d) a second put operating mode whereby said thumb member is translated in a forward longitudinal direction, said finger member is placed in a parked position at said elongate track forward end, said finger member latch portion disengages from said cartridge, and said thumb member first surface disengages from said finger member first inner surface; and e) a second retrieve operating mode whereby said thumb member is translated in a rearward longitudinal direction, and said thumb member second surface abuttingly engages said finger member second inner surface causing said finger member to be released from said parked position, said finger member second inner surface aligns with said thumb member second surface, and said thumb member is positioned between said finger member first inner surface and said finger member second inner surface.

16. A method of translating a cartridge with a cartridge engaging assembly from a first cartridge receiving device to a second cartridge receiving device, said cartridge engaging assembly comprising a laterally extending thumb member comprising a first surface and a second surface, at least one floating finger member which is detached from said thumb member, said finger member comprising at least one guide post, a first inner surface, a second inner surface, a front portion and a rear portion, at least one guide sleeve comprising an elongate track, said elongate track comprising an inner branch and an outer branch, and a flexible gate member positioned within said elongate track, comprising the steps of:

a) translating said thumb member in a forward longitudinal direction whereby said thumb member abuttingly engages said finger member front portion, aligning said finger member first inner surface with said thumb member first surface so that said finger member rear portion is urged laterally outwardly and said finger member guide post is urged laterally inwardly, displacing said guide post along said inner branch of said elongate track, and latching onto said cartridge with said finger member;

b) translating said thumb member in a rearward longitudinal direction whereby said thumb member abuttingly engages said finger member rear portion and said finger member pulls said cartridge member from said first cartridge receiving device in said rearward longitudinal direction, displacing said guide post along said inner branch of said elongate track, and compressing and rotating said flexible gate member to allow said guide post to pass thereby;

c) translating said cartridge engaging assembly with said cartridge to said second cartridge receiving device;

d) translating said thumb member in a forward longitudinal direction whereby said thumb member abuttingly engages said finger member front portion and said finger member front portion abuttingly engages said cartridge whereby said finger member pushes said cartridge in said forward longitudinal direction, and displacing said guide post along said outer branch of said elongate track;

e) disengaging said finger member from said cartridge and placing said finger member in a parked position, and translating said thumb member in said forward longitudinal direction past said finger member whereby said thumb member abuttingly engages said cartridge and pushes said cartridge into said second cartridge receiving device in said forward longitudinal direction; and f) translating said thumb member in said rearward longitudinal direction whereby said thumb member abuttingly engages said finger member rear portion and disengages said finger member from said parked position, and aligning said finger member second inner surface with said thumb member second surface.

* * * * *

UNITED STATES PATENT AND TRADEMARK OFFICE
CERTIFICATE OF CORRECTION

PATENT NO.    : 6,301,218 B1
DATED         : October 9, 2001
INVENTOR(S)   : Jones It is certified that error appears in the above-identified patent and that said Letters Patent is hereby corrected as shown below:

<u>Column 4,</u>
Lines 28-29, delete "Fig. 6 sectional view of a gate assembly from the cartridge engaging assembly of Fig. 3;" and insert therefor
-- Fig. 6A first section of a gate assembly view from the cartridge engaging assembly of Fig. 3;
   Fig. 6B second section of a gate assembly view from the cartridge engaging assembly of Fig. 3; --

Signed and Sealed this

Twenty-fifth Day of November, 2003

JAMES E. ROGAN
*Director of the United States Patent and Trademark Office*